United States Patent [19]
Ota et al.

[11] Patent Number: 6,027,253
[45] Date of Patent: Feb. 22, 2000

[54] OPTICAL FIBER ARRAY

[75] Inventors: Takashi Ota, Kasugai; Masashi Fukuyama, Inuyama; Hironori Kurimoto, Konan, all of Japan

[73] Assignee: NGK Insulators, Ltd., Japan

[21] Appl. No.: 08/699,951

[22] Filed: Aug. 20, 1996

[30] Foreign Application Priority Data

Aug. 24, 1995 [JP] Japan .................................. 7-215777
Jul. 23, 1996 [JP] Japan .................................. 8-193234

[51] Int. Cl.$^7$ ...................................................... G02B 6/36
[52] U.S. Cl. .................................. 385/83; 385/78; 385/59
[58] Field of Search .............................. 385/83, 76–78, 385/65, 69

[56] References Cited

U.S. PATENT DOCUMENTS

| | | | |
|---|---|---|---|
| 4,639,074 | 1/1987 | Murphy | 385/126 |
| 4,875,969 | 10/1989 | Hsu et al. | 156/633 |
| 5,257,334 | 10/1993 | Takahashi | 385/83 |
| 5,446,815 | 8/1995 | Ota et al. | 385/83 |

FOREIGN PATENT DOCUMENTS

| | | | |
|---|---|---|---|
| 0309677 | 4/1989 | European Pat. Off. | 385/65 |
| 0331334 | 9/1989 | European Pat. Off. | |
| 0338642 | 10/1989 | European Pat. Off. | |
| 0403761 | 12/1990 | European Pat. Off. | |
| 0573288 | 12/1993 | European Pat. Off. | |
| 55-45051 | 3/1980 | Japan . | |
| 57-58112 | 4/1982 | Japan . | |
| 6161111 | 3/1986 | Japan . | |
| 63-278004 | 11/1988 | Japan . | |
| 364052101 | 2/1989 | Japan | 385/65 |
| 2-125209 | 5/1990 | Japan . | |
| 0256008 | 10/1990 | Japan | 385/65 |
| 4-101504 | 9/1992 | Japan . | |
| 676513 A5 | 1/1991 | Switzerland . | |
| 2191601 | 12/1987 | United Kingdom . | |

OTHER PUBLICATIONS

Patent Abstracts of Japan, vol. 7, No. 274 ((P–241) [1419], Dec. 7, 1983 & JP–A–58 152215 (Kogyo Gijutsuin), Sep. 9, 1983, *abstract*.
Patent Abstracts of Japan, vol. 17, No. 107 (P–1496), Mar. 4, 1993 & JP–A–04 296802 (NGK Insulators), Oct. 21, 1992, *abstract*.
Patent Abstracts of Japan, vol. 8, No. 129 (P–280) [1566], Jun. 15, 1984 & JP–A–59 031918 (Fujitsu) *abstract*.
Patent Abstracts of Japan, vol. 8, No. 208 (P–302) [1645], Sep. 21, 1984 & JP–A–59 091407 (Furukawa Denki Kogyo), May 26, 1984, *abstract*.

*Primary Examiner*—John D. Lee
*Assistant Examiner*—Ellen E. Kang
*Attorney, Agent, or Firm*—Wall Marjama & Bilinski

[57] ABSTRACT

An optical fiber array including a V-groove substrate having a V-groove on which an optical fiber is arranged and a fiber fix substrate for fixing the optical fiber arranged on the V-grooves. In the optical fiber array according to the invention, one of the V-groove substrate and the fiber fix substrate has a concave portion into which the other substrate is arranged in such a manner that a bottom surface of the concave portion of the one substrate is connected to a bottom surface of the other substrate directly or via the optical fiber, and the concave portion has side end walls whose thickness is thicker than that of a bottom portion in which the V-grooves are formed. Moreover, side inner surfaces of the concave portion of the one substrate and side surfaces of the other substrate have a taper shape extending gradually wider toward an opening of the concave portion.

7 Claims, 6 Drawing Sheets

FIG_3

FIG_4

FIG_5

FIG_6a

θ1+θ2 UV light

FIG_6b

FIG_6c $\sin(\theta_1) = 1.47 \sin(\theta_4)$
$10 \times \tan(\theta_1) + \tan(\theta_4) = 4.5/2$
$\theta_1 = 8.08°$ (in case of pyrex)
($\theta_1 = 7.7°$ in case of quartz)

OPTICAL FIBER ARRAY

BACKGROUND OF THE INVENTION

(1) Field of the Invention

The present invention relates to an optical fiber array including a V-groove substrate having a V-groove on which an optical fiber is arranged and a fiber fix substrate for fixing the optical fiber arranged on the V-groove.

(2) Related Art Statement

Usually, as a member constructing a highly reliable optical connector, various types of optical fiber arrays, which include a V-groove substrate having a V-groove on which an optical fiber is arranged and a fiber fix substrate for fixing the optical fiber arranged on the V-groove, are known.

Figure 8:
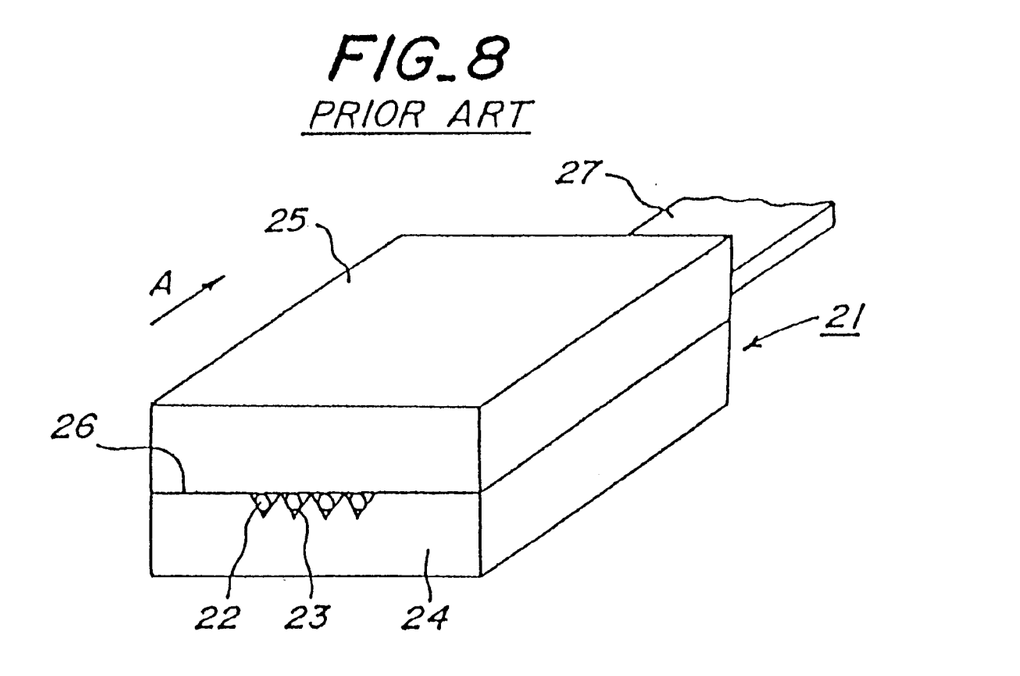
FIG. 8 is a schematic view illustrating one embodiment of a known optical fiber array.

FIG. 8 is a schematic view showing one embodiment of a known optical fiber array. In FIG. 8, an optical fiber array 21 comprises a V-groove substrate 24 having a V-groove 23 on which an optical fiber 22 is arranged, and a fiber fix substrate 25 for fixing the optical fiber 22 arranged on the V-groove 23. The V-groove substrate 24 and the fiber fix substrate 25 are connected to each other at a fiber connecting plane 26 by using an adhesive and so on.

The V-groove 23 is arranged partly from one end along a longitudinal direction A of the optical fiber array 21. A concave portion not shown is arranged in the connected V-groove substrate 24 and the fiber fix substrate 25 from one end of the V-groove 23 to the other end of the optical fiber array. Therefore, a tape fiber 27, in which a predetermined number of the optical fibers 22, i.e., four optical fibers 22 in FIG. 8, are integrated, is fixed in the optical fiber array 21 in such a manner that bared optical fibers 22 at one end portion of the tape fiber 27 are fixed on the V-grooves 23 and the tape fiber 27 other than the bared optical fibers 22 is fixed in the concave portion mentioned above.

In the known optical fiber array 21 mentioned above, the V-groove substrate 24 and the fiber fix substrate 25 are connected at the fiber connecting plane 26 having a linear shape. Therefore, if heat and humidity are applied to the known optical fiber array 21, a water component is introduced along the fiber connecting plane 26 from the exposed end thereof, and the V-groove substrate 24 and the fiber fix substrate 25 are liable to be disconnected from each other. Therefore, it is necessary to use a special high reliability adhesive, and thus there is a large limitation on manufacturing the optical fiber array 21.

In order to eliminate the drawbacks mentioned above, as shown in Japanese Utility-model Laid-open Publication No. 4-101504, it is possible to use an optical fiber in which one of the V-groove substrate 24 and the fiber fix substrate 25 has a concave portion into which the other substrate is arranged in such a manner that a bottom surface of the concave portion of the one substrate is connected to a bottom surface of the other substrate directly or via the optical fiber 22. One example of such an embodiment is shown in FIG. 9 in which the V-groove substrate 24 has the concave portion having side end walls 28 whose thickness is thicker than that of a bottom portion 29 in which the V-grooves 23 are formed.

Figure 9:
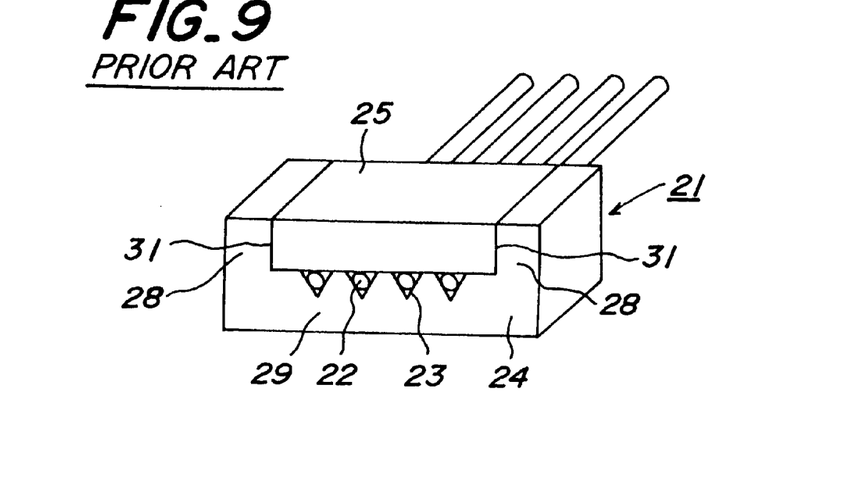
FIG. 9 is a schematic view depicting another embodiment of the known optical fiber array.

In the embodiment shown in FIG. 9, the V-groove substrate 24 and the fiber fix substrate 25 are connected by using an adhesive of an ultraviolet hardening type. Therefore, the following disadvantages occur.

Figure 10A:
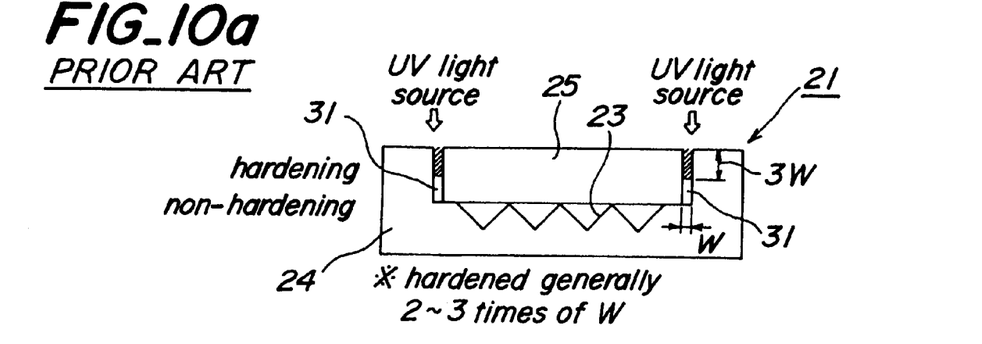
FIGS. 10a to 10c are schematic view for explaining the drawbacks of the known optical fiber array respectively.

(1) In FIG. 9, if an ultraviolet light (UV light) is incident upon the optical fiber array 21 from an upper side, the incident light is not introduced into all portion of an adhesive 31 arranged between an inner side surface of the V-groove substrate 24 which constructs the concave portion and an outer side surface of the fiber fix substrate 25 i.e., into a portion to which the bottom portion of the V-groove substrate 24 is contacted. In this case, a non-hardening portion of the adhesive 31 occurs as shown in FIG. 10a. Therefore, a reliability of the optical fiber array 21 becomes worse due to the non-hardening portion.

Figure 10B:
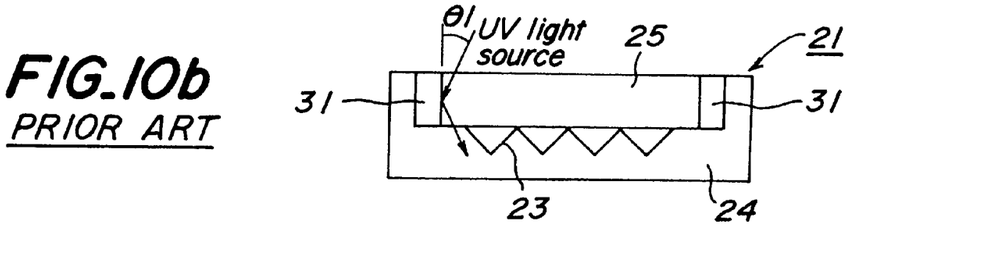

(2) The UV light spot incident upon the adhesive 31 is broad and has an incident angle of θ1. In this case, since a reflection rate of the non-hardening adhesive 31 is different from that of the V-groove substrate 24, the UV light incident upon the optical fiber array 21 having an incident angle of θ1 is reflected, and thus the UV light is not introduced into the adhesive 31. Therefore, the adhesive is not uniformly hardened as shown in FIG. 10b. In addition, a reliability of the optical fiber array 21 becomes worse due to the nonuniform hardening.

Figure 10C:
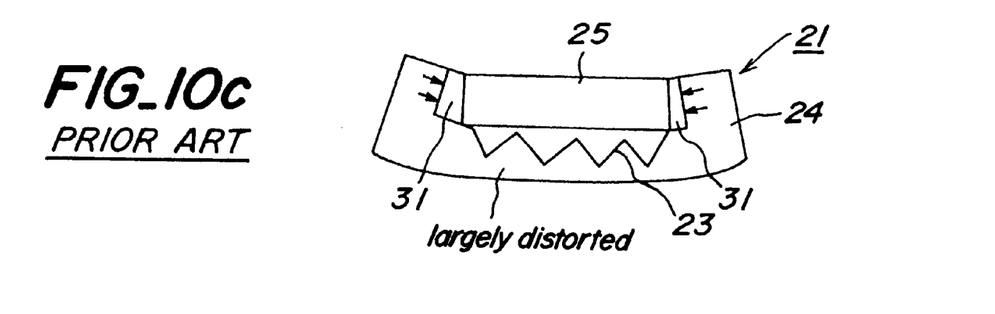

(3) Since the adhesive 31 shrinks, the bottom portion of the concave portion of the V-groove substrate 24 is distorted and thus the V-grooves 23 are also distorted. Accordingly, the optical fibers 22 arranged in the V-grooves 23 are moved, and thus a light transmitting loss when connecting is increased. In addition, since a stress due to the distortion is liable to be concentrated to a corner of the concave portion, the V-groove substrate 24 is liable to be fractured from this corner as shown in FIG. 10c.

(4) Since the adhesive 31 arranged between the inner side surface of the V-groove substrate 24 which constructs the concave portion and the outer side surface of the fiber fix substrate 25 is extended vertically, an area of the adhesive 31 contributed to the adhesion is small. Therefore, a connection strength between the V-groove substrate 24 and the fiber fix substrate 25 is decreased.

(5) When the fiber fix substrate 25 is installed with the V-groove substrate 24, it is difficult to insert the fiber fix substrate 25 into the concave portion of the V-groove substrate 24.

SUMMARY OF THE INVENTION

It is an object of the invention to eliminate the drawbacks mentioned above and to provide an optical fiber array having a higher reliability than that of the known optical fiber array.

According to the present invention, an optical fiber array including a V-groove substrate having a V-groove on which an optical fiber is arranged and a fiber fix substrate for fixing the optical fiber arranged on the V-groove, comprises such a construction that one of the V-groove substrate and the fiber fix substrate has a concave portion into which the other substrate is arranged in such a manner that a bottom surface of the concave portion of the one substrate is connected to a bottom surface of the other substrate directly or via the optical fiber, said concave portion having side end walls whose thickness is thicker than that of a bottom portion in which the V-grooves are formed, and side inner surfaces of the concave portion of the one substrate and side surfaces of the other substrate have a taper shape extending gradually wide toward an opening of the concave portion.

In the optical fiber array mentioned above, in order to fix the optical fiber on the V-groove, one of the V-groove substrate and the fiber fix substrate has a concave portion into which the other substrate is arranged in such a manner that a bottom surface of the concave portion of the one substrate is connected to a bottom surface of the other substrate directly or via the optical fiber. Therefore, a connection plane between the V-groove substrate and the fiber fix substrate is along a bottom plane and a side inner plane. In addition, a fiber connection plane on which the optical fibers exist and an exposed end of the connection plane mentioned above is not aligned straight but windingly. As a result, a water component is not liable to be introduced into the fiber connection plane mentioned above via the connection plane between the V-groove substrate and the fiber fix substrate. Therefore, a deterioration of the fiber connection plane due to the introduced water component can be prevented, and thus it is possible to obtain the optical fiber array having a higher reliability.

Moreover, in the optical fiber array mentioned above, side inner surfaces of the concave portion of one of the V-groove substrate and the fiber fix substrate and side surfaces of the other substrate have a taper shape extending gradually wide toward an opening of the concave portion. In this case, if the V-groove substrate and the fiber fix substrate are connected by applying an UV light on an adhesive of an ultraviolet hardening type arranged in a portion having a taper shape between the V-groove substrate and the fiber fix substrate, an UV light is not reflected on the connection plane and thus can be uniformly incident upon the adhesive arranged on the portion having a taper shape. Therefore, it is possible to eliminate the non-hardening portion of the adhesive and the distortion of the V-groove and the corner, and to improve the strength of the optical fiber array and the installation ability.

Further, if the V-groove substrate and the fiber fix substrate are made of ceramics or glass, especially if they are manufactured by a powder press method using ceramics powders, or if they are manufactured by a glass melting forming method by using glass, it is preferred to obtain the V-groove substrate and the fiber fix substrate both having a complicated shape in a relatively easy and highly precise manner.

Furthermore, since the V-groove substrate or the fiber fix substrate which has the concave portion is machined by a grinding method, the corner of the concave portion becomes an R shape due to a wear by a grinder for use in the grinding method. Under such a condition, if the V-groove substrate and the fiber fix substrate are connected, a gap is generated at the connection plane therebetween, and in an extreme case the optical fiber is not fixed. In order to eliminate the drawbacks mentioned above, it is preferred to arrange a recess for keeping a residual adhesive at the corner of the concave portion. In addition, it is preferred to cut the corner of the V-groove substrate or the fiber fix substrate which is inserted into the concave portion to form a chamfer portion.

Moreover, it is preferred that an angle of the taper shape of the V-groove substrate or the fiber fix substrate which is inserted into the concave portion i.e. an angle of a taper plane with respect to a plane vertical to a V-groove forming plane of the V-groove substrate is more than 1.4°, and further an angle of the taper shape of the concave portion is more than 1.4°. This is because, in these cases, an UV light transmitted through the V-groove substrate or the fiber fix substrate which is inserted into the concave portion is not reflected at all at the tapered connection plane between the V-groove substrate and the fiber fix substrate, and thus an UV light is incident upon the adhesive arranged in the tapered connection plane.

DESCRIPTION OF THE PREFERRED EMBODIMENT

Figure 1:
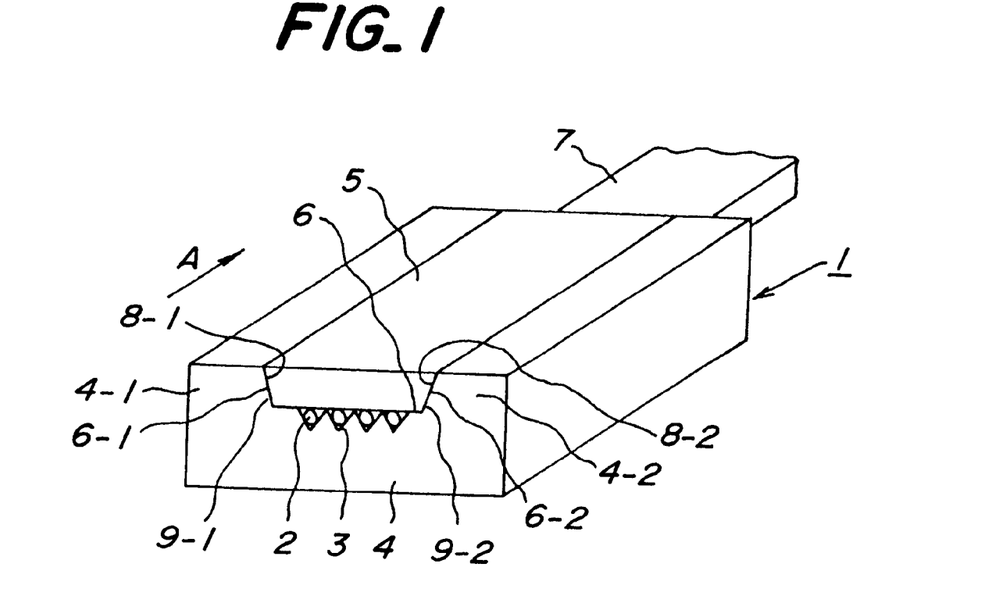
FIG. 1 is a schematic view showing one embodiment of an optical fiber array according to the invention.

FIG. 1 is a schematic view showing one embodiment of an optical fiber array according to the invention. In FIG. 1, an optical fiber array 1 comprises a V-groove substrate 4 having a plurality of V-grooves 3 on which an optical fiber 2 is arranged, and a fiber fix substrate 5 for fixing the optical fibers 2 arranged on the V-groove 3. In the embodiment mentioned above, one feature of the present invention is that side projection portions 4-1, 4-2, whose thickness is thicker than that of a portion of the V-groove substrate 4 in which a fiber connection plane 6 contacted with the optical fiber 2 exists, are integrally formed to obtain the V-groove substrate 4 having a concave portion. Another feature of the present invention is that side inner surfaces 8-1, 8-2 of the concave portion of the V-groove substrate 4 and side surfaces 9-1, 9-2 of the fiber fix substrate 5 have a taper shape extending gradually wide toward an opening of the concave portion. Then, the fiber fix substrate 5 is inserted and connected into the concave portion of the V-groove substrate 4 to fix the optical fibers 2 on the V-grooves 3.

Also in the embodiment mentioned above, as is the same as the known example, the V-groove 3 is arranged partly along a longitudinal direction A of the optical fiber array 1. A concave portion not shown is arranged in the connected V-groove substrate 4 and the fiber fix substrate 5 from one end of the V-groove 3 to the other end of the optical fiber array 1. Therefore, a tape fiber 7, in which a predetermined number of the optical fibers 2 i.e., four optical fibers 2 in FIG. 1, are integrated, is fixed in the optical fiber array 1 in such a manner that bared optical fibers 2 at one end portion of the tape fiber 7 are fixed on the V-grooves 3 and the tape fiber 7 other than the bared optical fibers 2 is fixed in the concave portion mentioned above.

In the optical fiber array 1 mentioned above, the fiber connection plane 6 is not directly disposed outwardly. That is to say, a connection plane between the V-groove substrate 4 and the fiber fix substrate 5 has a concave, i.e., not straight, shape including the fiber connection plane 6 and connection planes 6-1, 6-2 between the side projection portions 4-1, 4-2 projected vertically with respect to the fiber connection plane 6 and the fiber fix substrate 5. In this case, a water component and so on is introduced from exposed ends of the connection planes 6-1, 6-2 and a deterioration of the optical fiber array 1 occurs. However, in the embodiment mentioned above, since the connection plane is not straight, it is difficult to introduce a water component to the fiber connection plane 6 via the connection plane. Therefore, the optical fiber array 1 is not deteriorated.

Moreover, in the embodiment mentioned above, the side inner surfaces 8-1, 8-2 of the concave portion of the V-groove substrate 4 and the side surfaces 9-1, 9-2 of the fiber fix substrate 5 have a taper shape extending gradually wider toward an opening of the concave portion. In addition, an angle of a taper plane is preferably set to more than 1.4°. Therefore, if an UV light is incident upon an adhesive having an ultraviolet hardening type arranged on the connection planes 6-1, 6-2 from an upper side thereof, an UV light transmitted through the fiber fix substrate 5 which is inserted into the concave portion is not reflected at all at the tapered connection planes 9-1, 9-2 of the fiber fix substrate 5, and thus an UV light is incident upon the adhesive.

Figure 2:
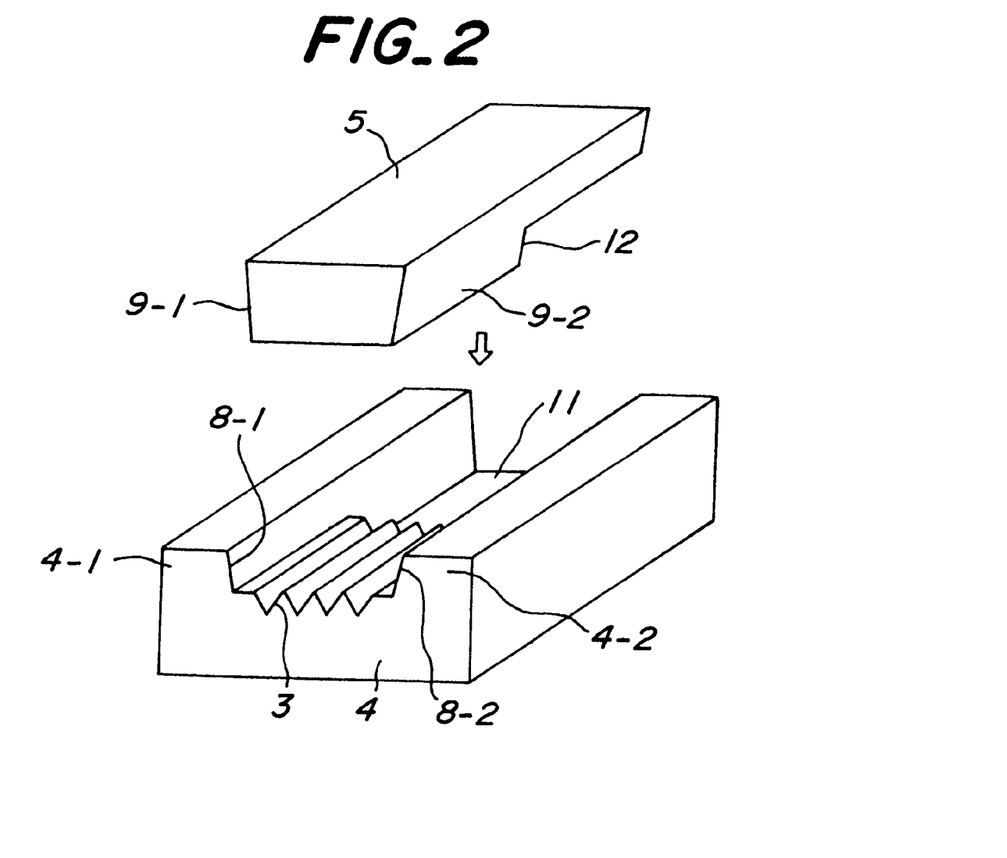
FIG. 2 is a schematic view illustrating one state that the optical fiber array according to the invention is installed.
Figure 3:
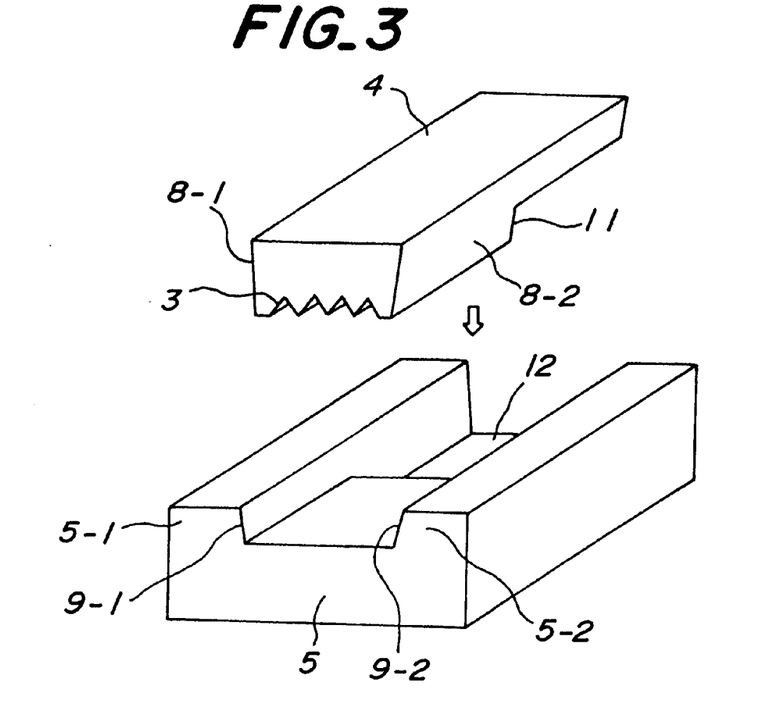
FIG. 3 is a schematic view depicting the another state that the optical fiber array according to the invention.

FIGS. 2 and 3 are schematic views respectively showing a state that the optical fiber array 1 is installed. In the embodiment shown in FIG. 2, the V-groove substrate 4 has the concave portion as is the same as the embodiment shown in FIG. 1. In the embodiment shown in FIG. 3, side projection portions 5-1, 5-2 are formed integrally to the fiber fix substrate 5 to obtain the fiber fix substrate 5 having a concave portion. In the embodiments shown in FIGS. 2 and 3, portions similar to those of FIG. 1 are denoted by the same reference numerals shown in FIG. 1, and explanations thereof are omitted here. In FIGS. 2 and 3, concave portions 11 and 12 are formed in the V-groove substrate 4 and the fiber fix substrate 5 respectively to accommodate a tape fiber 7 having a cover layer. It should be noted that in FIG. 3 numerals 8-1, 9-2 show side surfaces of the V-groove substrate 4 and numerals 9-1, 9-2 show side inner surfaces of the fiber fix substrate 5.

In both of the embodiments shown in FIG. 2 and 3, the installation of the optical fiber array 1 is as follows. At first, the optical fibers 2 are arranged on a bottom surface of the concave portion of one substrate. Then, the other substrate is inserted into the concave portion in such a manner that the optical fibers 2 are arranged on the V-grooves 3 formed in either substrate. Then, a load is applied to fasten the substrates. After that, a resin as an adhesive having an ultraviolet hardening type is supplied to the V-groove 3, the fiber connection plane 6, and the connection planes 6-1, 6-2. Then, an UV light is incident upon those members from an upper side to harden the resin. In this case, it is preferred to form a hole in the fiber fix substrate 5 for supplying a resin.

Figure 4:
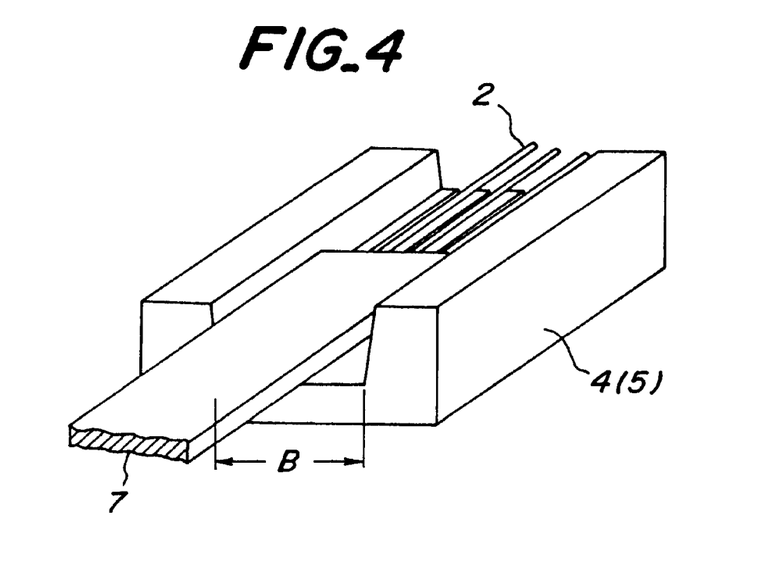
FIG. 4 is a schematic view for explaining a preferred shape of a concave portion of the optical fiber array according to the invention.

Moreover, as shown in FIG. 4, it is preferred to set a width B of the bottom portion of the concave portion 11 or 12 to that of the tape fiber 7 so as to arrange the optical fibers 2 on the substrate having the concave portion. Further, it is preferred to set dimensions of the concave portions 11 and 12 in a thickness direction of the substrate in such a manner that the tape fiber 7 is just fitted therein when the optical fibers 2 are arranged on the V-groove 3. In this case, it is preferred to set positions of the V-grooves 3 corresponding to those of the optical fibers 2 in the tape fiber 7. For example, in the case of using the tape fiber 7 which is on the market, since a distance from a side surface of the tape fiber 7 to a first optical fiber 2 is about 0.1 mm, it is preferred to set a first V-groove 3 to a distance of 0.1 mm from the inner side surface of the concave portion.

Further, it is necessary to set a width of the concave portion of one substrate larger than that of the other substrate, since the other substrate must be fitted in the concave portion of one substrate. In this case, it is preferred to set a clearance between the concave portion as small as possible, since the clearance receives an adhesive layer. However, it is permissive that the clearance is less than 0.1 mm. From the view point of a machining precision, it is most suitable to set the clearance therebetween to about 20 μm.

Figure 5:
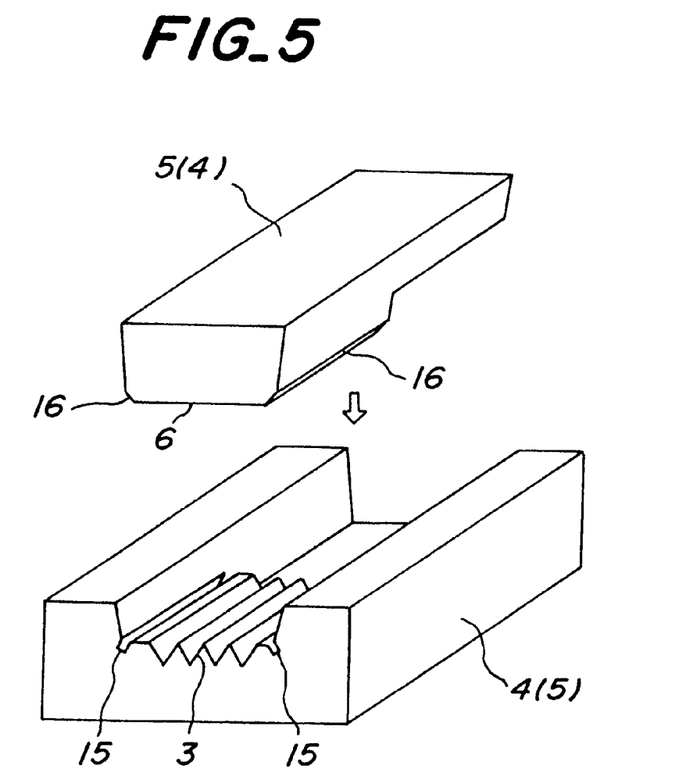
FIG. 5 is a schematic view for explaining a recess and a corner cut portion of a preferred embodiment of the optical fiber array according to the invention.

In the optical fiber array 1 according to the present invention, when the concave portion is formed by a grinding, a corner of the concave portion is not sharp, i.e., it becomes an R shape. In this case, if one tries to fit the other substrate tightly in the concave portion of one substrate, the substrates are not connected tightly. In an extreme case, there is a possibility that the fiber fix substrate 5 is not contacted to the optical fibers 2. In order to eliminate the drawback mentioned above, it is preferred to arrange a recess 15 for keeping a residual adhesive at the corner of the concave portion as shown in FIG. 5. Moreover, it is preferred to arrange a chamfer portion 16 at a corner of the fiber connection plane 6 of the substrate which is inserted into the concave portion as shown in FIG. 5. In this case, the chamfer portion 16 is formed by a so called C chamfer portion.

After the optical fibers 2 are installed in the optical fiber array 1 in the manner mentioned above, it is necessary to grind both end surfaces of the optical fiber array 1 to a predetermined angle such as a right angle. In the embodiment shown in FIG. 1 (FIG. 2), either of side surfaces of the V-groove substrate 4 having the concave portion is formed parallel to an extending direction of the V-groove 3. Therefore, it is possible to obtain a predetermined angle in an easy manner if the grinding is performed on the basis of the extending direction of the V-groove 3. Moreover, in the embodiment shown in FIG. 3, side surfaces of the V-groove substrate 4 are not exposed outside the optical fiber array 1. Therefore, at first, a parallel relation in the extending direction of the V-groove 3 between the inner side surfaces having a taper shape of the concave portion and the outer side surfaces is maintained in the fiber fix substrate 5. Then, a parallel relation in the extending direction of the V-groove 3 is maintained between the side surfaces having a taper shape and the V-groove 3 in the V-groove substrate 4. A parallel relation is also maintained in the extending direction of the V-groove 3 between the outer side surfaces of the fiber fix substrate 5 and the V-groove 3 by fitting the inner side surfaces having a taper shape of the fiber fix substrate 5 to the side surfaces having a taper shape of the V-groove substrate 4. In this manner, a predetermined angle can be obtained by grinding on the basis of the outer side surface of the fiber fix substrate 5. In the embodiment mentioned above, it is preferred to make respective parallel rate to less than 0.01°.

In the known optical fiber array shown in FIG. 8, since the connection plane between the V-groove substrate and the fiber fix substrate exists at the side surface of the optical fiber array, the adhesive used for the installation is stuck out at the side surface of the optical fiber array. In this case, the side surface of the optical fiber array can not be used as a standard for the grinding, and thus it is necessary to wipe the stuck adhesive after the installation. On the other hand, in the present invention, since no connection plane exists at the side surface of the optical fiber array, it is possible to use the side surface of the optical fiber array as a standard for the grinding.

In the present invention, the inner side surface of the concave portion of the V-groove substrate 4 or the fiber fix substrate 5 and the side surface of the other fiber fix substrate 5 or V-groove substrate 4 have a taper shape extending gradually wider toward an opening of the concave portion.

Then, the adhesive having an ultraviolet (UV) hardening type is arranged to a portion between the inner side surface of the concave portion of one substrate and the side surface of the other substrate both having a taper shape and a portion other than the V-grooves 3 between a bottom surface of the concave portion of one substrate and a bottom surface of the other substrate. After that, an UV light is incident upon the optical fiber array from an upper side so as to harden the adhesive. In this manner, the V-groove substrate 4 and the fiber fix substrate 5 are connected with each other. In this case, the UV light introduced from the upper side is generally transmitted through the V-groove substrate 4 and the fiber fix substrate 5. Therefore, the adhesive arranged at the portion other than the V-grooves 3 between the bottom surface of the concave portion of one substrate and the bottom surface of the other substrate is hardened preferably. However, the adhesive arranged at the portion between the inner side surface of the concave portion of one substrate and the side surface of the other substrate both having a taper shape is not completely hardened, if a relation between an incident angle of the UV light and a taper angle is varied. In this case, there remains a non-hardening adhesive layer.

Figure 6A:
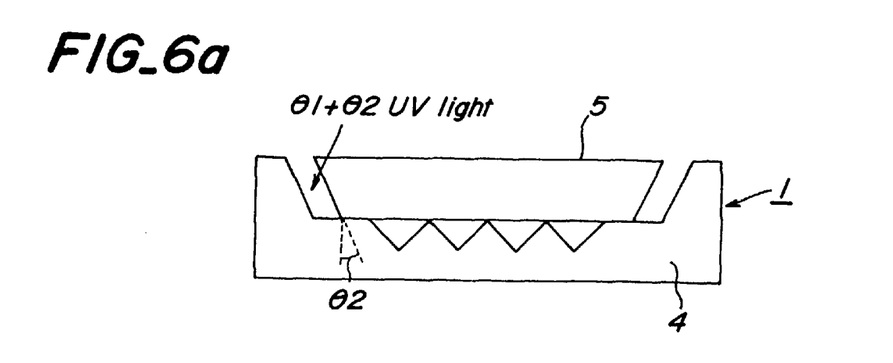
FIGS. 6a to 6c are schematic views for explaining a preferred taper angle of the optical fiber array according to the invention respectively.
Figure 6B:
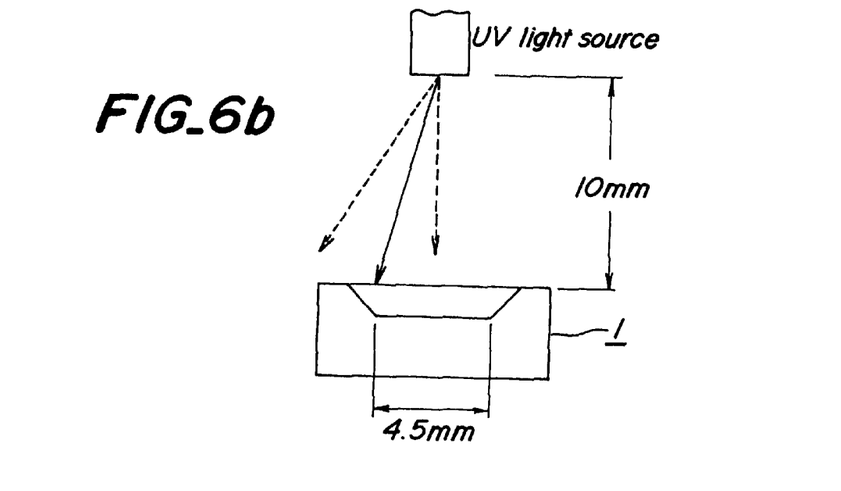
Figure 6C:
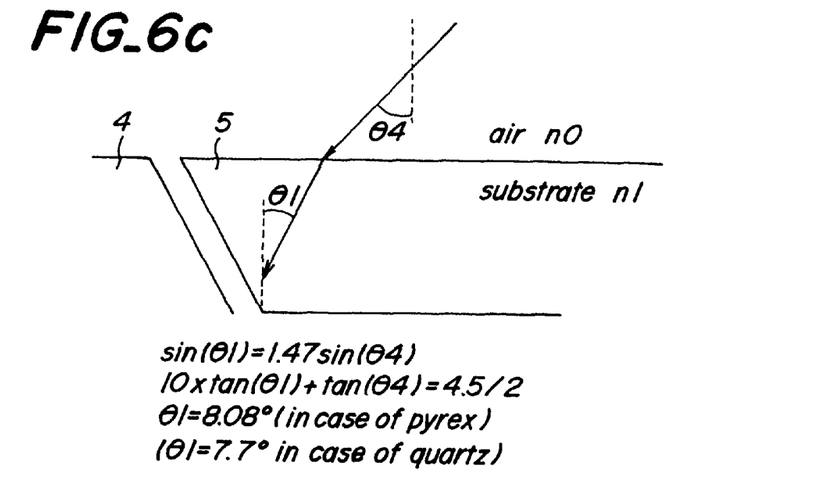

Hereinafter, the taper angle of the taper shape i.e. an angle between the tapered side surface and a plane vertical to a plane on which the V-grooves 3 are arranged, will be explained with reference to FIGS. 6a to 6c. In the embodiments shown in FIGS. 6a to 6c, θ1 is the incident angle of the UV light, θ2 is the taper angle of the taper shape, n1 is a refraction index of the substrate, and n2 is a refraction index of the adhesive before hardened. At first, in FIG. 6a, the taper angle θ2 necessary to obtain a high transmissivity of the UV light is determined by the incident angle θ1 of the UV light, the refraction index n1 of the substrate dependent upon materials of the substrate, and the refraction index n2 of the adhesive before hardened. Moreover, the incident angle θ1 of the UV light is dependent upon a condition of the UV light application. As shown in FIG. 6b, it is generally assumed that a width of the bottom portion of the concave portion in the optical fiber array 1 is about 4.5 mm and a distance between the UV light source and the optical fiber array 1 is 10 mm. In this case, as shown in FIG. 6c, the incident angle θ1 becomes 8.1° when the substrate plugging the concave portion is made of Pyrex (trade mark). Then, an angle θ4 necessary for transmitting, i.e., not reflecting, is determined from the refraction indexes n1 and n2 on the basis of Snell laws of refraction, and the results of the determination are shown in the following Table 1.

TABLE 1

| quartz (UV incident angle 7.7°) | | | BK-7 (UV incident angle 7.9°) | | | pyrex (UV incident angle 8.1°) | | |
| --- | --- | --- | --- | --- | --- | --- | --- | --- |
| n1 | n2 | θ4 | n1 | n2 | θ4 | n1 | n2 | θ4 |
| 1.55 | 1.43 | 22.7° | 1.51 | 1.43 | 18.5° | 1.47 | 1.43 | 13.4° |
| 1.55 | 1.45 | 20.7° | 1.51 | 1.45 | 16.2° | 1.47 | 1.45 | 9.5° |
| 1.55 | 1.47 | 18.5° | 1.51 | 1.47 | 13.2° | 1.47 | 1.47 | 0° |

The condition necessary for transmitting the UV light through the side surface of the substrate plugging the concave portion is θ4<θ1+θ2. In order to satisfy the transmitting condition, i.e., the inequality mentioned above for all the cases shown in Table 1, it is sufficient to satisfy the above inequality in the case of the maximum θ4 of 22.7° in quartz. In this case, θ2>15.0° is obtained from 22.7°<7.7°+θ2. However, Pyrex is generally used as the substrate material. In this case, it is sufficient to set the taper angle θ2 to 1.4° (9.5°–8.1°) at minimum when using the adhesive having a refraction index less than 1.45 so as to introduce the UV light to the adhesive without being reflected. Therefore, in the present invention, it is preferred to set the taper angle θ2 to less than 1.4°.

Figure 7:
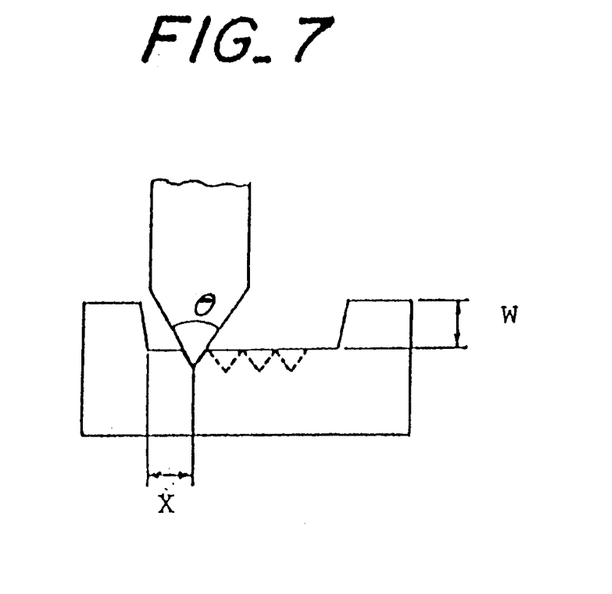
FIG. 7 is a schematic view showing one embodiment of manufacturing the optical fiber array according to the invention.

Next, a manufacturing method will be explained. In the present invention, a method of manufacturing the V-groove substrate 4 and the fiber fix substrate 5 is not limited and all known manufacturing methods can be used preferably. However, when the V-groove substrate 4 and the fiber fix substrate 5 shown in FIGS. 1 and 2 are manufactured by grinding, a diamond grinder having a width of generally a few mm is used. Therefore, if it is assumed that a depth d of the concave portion is 2 mm and an angle θ of the V-groove is 70°, it is necessary to set a distance X from the end of the filter connection plane to a center of the first V-groove to 1.4 at minimum as shown in FIG. 7. The distance "X" is calculated based on 2 tan θ/2. In this case, it is impossible to form the first V-groove at a position 0.1 mm apart from the inner side surface of the concave portion. Of course, if use is made of the grinder having a width of less than 0.2 mm, it is possible to position the first V-groove as mentioned above. However, if use is made of the grinder having such a thin width, a stiffness of the grinder becomes low, and thus a grinding precision of the V-groove is liable to be decreased. Moreover, in the embodiment shown in FIG. 3, since the bottom surface of the concave portion is used for fixing the optical fibers, it is necessary to form the bottom surface having a fine plane. If such a fine bottom surface is to be formed by the grinding, it is necessary to perform the grinding by using the fine grinder for a long time or to further perform a post-grinding.

The problems mentioned above on manufacturing the V-groove substrate and the fiber fix substrate can be eliminated by using a powder press method when use is made of ceramics as raw materials or by using a transfer technique such as a glass melt forming method when use is made of glass as raw materials. As the glass melt forming method, it is possible to utilize the technic disclosed in Japanese Patent Laid-open Publication No. 4-296802 by the applicant. Moreover, the powder press method can be performed as follows.

At first, 3% of polyvinyl alcohol (PVA) and 1% of polyethylene glycol are added as a binder to alumina powders having a purity of 99.8% as raw materials to obtain a mixture. Then, the mixture is subjected to a spray dryer to obtain forming raw materials. Then, the thus obtained forming raw materials are filled in a predetermined die. Under such a condition, a stress of 2000 kg/cm$^2$ is applied to perform a press forming to obtain a formed body. After that, the formed body is fired at 1600° C. in an oxidation atmosphere to form the V-groove substrate 4 and the fiber fix substrate 5.

As clearly understood from the above, according to the present invention, one of the V-groove substrate and the fiber fix substrate has a concave portion and the other fiber fix substrate or the V-groove substrate is fitted in the concave portion. Therefore, a water component is not introduced into the fiber connection plane. Moreover, the inner side surface of the concave portion of one of the V-groove substrate and the fiber fix substrate and the side surface of the other fiber fix substrate or the V-groove substrate have a taper shape. Therefore, when the adhesive of the UV hardening type is arranged in the taper shape portion and the UV light is incident upon the optical fiber array from the upper side to harden the adhesive, it is possible to eliminate the non-hardening portion of the adhesive, prevent the distortion of the corner portion and the V-groove, and improve the strength and the installation property. Therefore, according to the invention, it is possible to obtain the optical fiber array having a high reliability.

What is claimed is:

1. An optical fiber array, comprising:

a V-groove substrate having at least one V-groove on which an optical fiber is arranged in an optical fiber connection plane defined by a surface of the V-groove substrate; and a fiber fix substrate for fixing the optical fiber arranged on the V-groove;

wherein one of the V-groove substrate and the fiber fix substrate comprises a concave portion into which the other substrate is disposed such that a bottom surface of the concave portion of said one substrate abuts a bottom surface of the other substrate directly or via the optical fiber, said one substrate having side end walls that cooperate to define said concave portion;

wherein side inner surfaces of the concave portion of said one substrate and side surfaces of the other substrate abut each other and taper gradually outwardly toward an opening of the concave portion; and wherein the bottom surface of the fiber fix substrate is substantially flat and substantially parallel to the optical fiber connection plane of the V-groove substrate.

2. The optical fiber array according to claim 1, wherein said V-groove substrate and said fiber fix substrate comprise ceramic or glass.

3. The optical fiber array according to claim 2, wherein said V-groove substrate and said fiber fix substrate are manufactured by a powder press method or by a glass melt forming method.

4. The optical fiber array according to claim 1, wherein a corner portion of said concave portion of said one substrate has a recess for receiving residual adhesive.

5. The optical fiber array according to claim 1, wherein a corner of the fiber connection plane of said other substrate has a chamfer portion.

6. The optical fiber array according to claim 1, wherein a taper angle of said other substrate is larger than 1.4°.

7. The optical fiber array according to claim 6, wherein a taper angle of said one substrate is larger than 1.4°.

* * * * *